(12) United States Patent
Tam et al.

(10) Patent No.: US 7,840,590 B2
(45) Date of Patent: *Nov. 23, 2010

(54) QUERYING AND FRAGMENT EXTRACTION WITHIN RESOURCES IN A HIERARCHICAL REPOSITORY

(75) Inventors: Man-Hay Tam, Belmont, CA (US); Thomas Baby, Foster City, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 11/641,379

(22) Filed: Dec. 18, 2006

(65) Prior Publication Data

US 2008/0147614 A1      Jun. 19, 2008

(51) Int. Cl.
*G06F 7/06* (2006.01)
(52) U.S. Cl. .................. 707/769; 707/696; 707/716; 707/741; 707/E17.014; 707/E17.132
(58) Field of Classification Search .................... 707/1, 707/3, 10, E17.014, E17.132, 999.003, 696, 707/716, 741, 769
See application file for complete search history.

(56) References Cited

U.S. PATENT DOCUMENTS

| 5,499,358 A | 3/1996 | Nevarez |
| 5,566,337 A | 10/1996 | Szymanski et al. |
| 5,643,633 A | 7/1997 | Telford et al. |
| 5,778,354 A | 7/1998 | Leslie et al. |
| 5,870,590 A | 2/1999 | Kita et al. |
| 5,897,638 A | 4/1999 | Lasser et al. |
| 5,924,088 A | 7/1999 | Jakobsson et al. |
| 5,974,407 A | 10/1999 | Sacks |
| 6,029,175 A | 2/2000 | Chow et al. |

(Continued)

FOREIGN PATENT DOCUMENTS

JP      07085102      3/1995

OTHER PUBLICATIONS

MacKenzie, David et al., "Finding Files", GNU Findutils Version 4.1.2, Nov. 1994, 38 pages.

(Continued)

*Primary Examiner*—Tim T. Vo
*Assistant Examiner*—Shiow-Jy Fan
(74) *Attorney, Agent, or Firm*—Hickman Palermo Truong & Becker LLP; Marcel K. Bingham; Daniel D. Ledesma

(57) ABSTRACT

Techniques for efficiently processing a query are provided. A query may specify a location path and a content path. The location path identifies the hierarchical location of a set of documents within a resource repository. The content path identifies hierarchical location of one or more nodes within the content of the set of documents. Computing the query includes using a repository index, based on the location path and the content path, to generate first results corresponding to the set of documents and second results corresponding to the one or more nodes. Final results of the query are based on the first results and second results. Another technique is provided for formatting a locator value in the repository index to support data that is stored object-relationally. Another technique is provided for storing index information about virtual content.

26 Claims, 3 Drawing Sheets

RESOURCE TABLE 210

| RES_ID | NAME | MODIFICATION DATE | AUTHOR | CONTENT |
|--------|------|-------------------|--------|---------|
| r1 | / | ... | ... | NULL |
| r2 | a | ... | ... | NULL |
| r3 | po1.xml | ... | ... | w1 |
| r4 | po2.xml | ... | ... | w2 |
| r5 | b | ... | ... | NULL |
| r6 | c | ... | ... | NULL |
| r7 | po1.xml | ... | ... | w3 |

U.S. PATENT DOCUMENTS

| | | |
|---|---|---|
| 6,279,007 B1 | 8/2001 | Uppala |
| 6,321,219 B1 | 11/2001 | Gainer et al. |
| 6,330,573 B1 | 12/2001 | Salisbury et al. |
| 6,366,902 B1 | 4/2002 | Lyle et al. |
| 6,381,607 B1 | 4/2002 | Wu et al. |
| 6,427,123 B1 | 7/2002 | Sedlar |
| 6,519,597 B1 * | 2/2003 | Cheng et al. .................. 707/10 |
| 6,584,459 B1 | 6/2003 | Chang et al. |
| 6,631,366 B1 | 10/2003 | Nagavamsi et al. |
| 6,643,633 B2 | 11/2003 | Chau et al. |
| 6,697,805 B1 | 2/2004 | Choquier et al. |
| 6,772,350 B1 | 8/2004 | Belani et al. |
| 6,965,894 B2 | 11/2005 | Leung et al. |
| 7,031,956 B1 | 4/2006 | Lee et al. |
| 7,089,239 B1 | 8/2006 | Baer et al. |
| 7,139,746 B2 | 11/2006 | Shin et al. |
| 7,162,485 B2 | 1/2007 | Gottlob et al. |
| 7,171,404 B2 | 1/2007 | Lindblad et al. |
| 7,171,407 B2 | 1/2007 | Barton et al. |
| 7,216,127 B2 | 5/2007 | Auerbach |
| 2001/0049675 A1 | 12/2001 | Mandler et al. |
| 2002/0073019 A1 | 6/2002 | Deaton |
| 2002/0078068 A1 | 6/2002 | Krishnaprasad et al. |
| 2002/0095421 A1 | 7/2002 | Koskas |
| 2002/0116457 A1 | 8/2002 | Eshleman et al. |
| 2002/0152267 A1 | 10/2002 | Lennon |
| 2002/0188613 A1 | 12/2002 | Chakraborty et al. |
| 2003/0033285 A1 | 2/2003 | Jalali et al. |
| 2003/0065659 A1 | 4/2003 | Agarwal et al. |
| 2003/0101169 A1 * | 5/2003 | Bhatt et al. .................... 707/3 |
| 2003/0131051 A1 | 7/2003 | Lection et al. |
| 2003/0177341 A1 | 9/2003 | Devillers |
| 2003/0212662 A1 | 11/2003 | Shin et al. |
| 2003/0212664 A1 | 11/2003 | Breining et al. |
| 2004/0010752 A1 | 1/2004 | Chan et al. |
| 2004/0044659 A1 | 3/2004 | Judd et al. |
| 2004/0073541 A1 | 4/2004 | Lindblad et al. |
| 2004/0083222 A1 | 4/2004 | Pecherer |
| 2004/0088320 A1 | 5/2004 | Perry |
| 2004/0103105 A1 | 5/2004 | Lindblad et al. |
| 2004/0148278 A1 | 7/2004 | Milo et al. |
| 2004/0167864 A1 | 8/2004 | Wang et al. |
| 2004/0205551 A1 | 10/2004 | Santos |
| 2004/0267760 A1 | 12/2004 | Brundage et al. |
| 2005/0038688 A1 | 2/2005 | Collins et al. |
| 2005/0050016 A1 | 3/2005 | Stanoi et al. |
| 2005/0055355 A1 | 3/2005 | Murthy et al. |
| 2005/0091188 A1 | 4/2005 | Pal et al. |
| 2005/0097108 A1 | 5/2005 | Wang et al. |
| 2005/0120029 A1 | 6/2005 | Tomic et al. |
| 2005/0120031 A1 | 6/2005 | Ishii |
| 2005/0228792 A1 | 10/2005 | Chandrasekaran et al. |
| 2005/0228818 A1 | 10/2005 | Murthy et al. |
| 2005/0228828 A1 * | 10/2005 | Chandrasekar et al. ... 707/104.1 |
| 2005/0229158 A1 | 10/2005 | Thusoo et al. |
| 2005/0240624 A1 | 10/2005 | Ge et al. |
| 2005/0257201 A1 | 11/2005 | Rose et al. |
| 2005/0289125 A1 | 12/2005 | Liu et al. |
| 2006/0101320 A1 | 5/2006 | Dodds et al. |
| 2007/0011167 A1 | 1/2007 | Krishnaprasad et al. |

OTHER PUBLICATIONS

Jurgens, Marcus, et al., "PISA: Performance Models for Index Structures with and without Aggregated data", German Research Society, 1999, 7 pages.

Pal, Shankar et al., "Indexing XML Data Stored in a Relational Database", Proceedings of the 30$^{th}$ VLDB Conference, 2004, 12 pages.

Girardot et al., "Millau: an encoding format for efficient representation and exchange of XML over the Web", IBM Almaden Research Center, 24 pages.

Shankar Pal et al., "Indexing XML Data Stored in a Relational Database", Proceedings of the 30$^{th}$ VLDB Conference, 2004, 12 pages.

Mackenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2$^{nd}$ Edition, 4 pages.

European Patent Office, "Communication pursuant to Article 94 (3) EPC", European patent application 05732473.3.-1225, dated Feb. 4, 2008, 7 pages.

State Intellectual Property Office of P.R.C., "Notification of the First Office Action", European patent application 2005800186273.9, dated Oct. 12, 2007, 9 pages.

CLAIMS, European patent application 2005800186273.9, 3 pages.

CLAIMS, European patent application 05732473.3.-1225, 3 pages.

Japanese Patent Office, "Questioning (Office Action)" with "Pending Claims" attached, Foreign Patent Application No. 600202/2000, received Apr. 28, 2008, 9 pages.

* cited by examiner

| RESOURCE TABLE 210 | | | | |
|---|---|---|---|---|
| RES_ID | NAME | MODIFICATION DATE | AUTHOR | CONTENT |
| r1 | / | ... | ... | NULL |
| r2 | a | ... | ... | NULL |
| r3 | po1.xml | ... | ... | w1 |
| r4 | po2.xml | ... | ... | w2 |
| r5 | b | ... | ... | NULL |
| r6 | c | ... | ... | NULL |
| r7 | po1.xml | ... | ... | w3 | ized
QUERYING AND FRAGMENT EXTRACTION WITHIN RESOURCES IN A HIERARCHICAL REPOSITORY

FIELD OF THE INVENTION

The present invention relates generally to computing queries on XML data, and more specifically to efficiently computing queries that include location paths and content paths.

RELATED CASES

This application is related to U.S. Pat. No. 6,427,123, entitled HIERARCHICAL INDEXING FOR ACCESSING HIERARCHICALLY ORGANIZED INFORMATION IN A RELATIONAL SYSTEM, filed on Feb. 19, 1999, the contents of which are herein incorporated by reference in their entirety for all purposes.

This application is related to U.S. Pat. No. 7,051,033, entitled PROVIDING A CONSISTENT HIERARCHICAL ABSTRACTION OF RELATIONAL DATA, filed on Sep. 27, 2002, the contents of which are herein incorporated by reference in their entirety for all purposes.

This application is related to U.S. patent application Ser. No. 10/260,381, entitled MECHANISM TO EFFICIENTLY INDEX STRUCTURED DATA THAT PROVIDES HIERARCHICAL ACCESS IN A RELATIONAL DATABASE SYSTEM, filed on Sep. 27, 2002, the contents of which are herein incorporated by reference in their entirety for all purposes.

This application is related to U.S. patent application Ser. No. 10/884,311, entitled INDEX FOR ACCESSING XML DATA, filed on Jul. 2, 2004, the contents of which are herein incorporated by reference in their entirety for all purposes.

This application is related to U.S. patent application Ser. No. 11/641,419, entitled XPATH BASED EVALUATION FOR CONTENT STORED IN A HIERARCHICAL DATABASE REPOSITORY USING XMLINDEX, filed on Dec. 18, 2006, the contents of which are herein incorporated by reference in their entirety for all purposes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Current approaches that address the problem of querying a repository of resources (e.g., XML documents) rely on indexes (typically, B-tree indexes) that are either column-based or function-based. When an XML document is stored in a database, the XML document may be "shredded" and stored in multiple columns. For example, the last modifier property of the XML document (indicating an identifier of the user that last modified the XML document) is stored in a "last modifier" column. If a user wanted to query on the last modifier property of a resource, then in a B-tree index would have to be created on the last modifier column. Any resource-level query had to be rewritten into an appropriate SQL-level query that is able to recognize the index on the last modifier column.

If these indexes are to be used to answer a query, then complex XML-specific query rewrites must occur so that the underlying relational engine was able to use the right indexes. This rewrite could not be done for many queries that searched within the content (or user-defined property) of a resource, since prior knowledge of the XML schema to which the content (or user-defined property) conformed was necessary to perform the rewrite. To see why, suppose the following query was submitted:

select res
from resource_table
where existsnode(res, '/Resource/content//PurchaseOrder')=1;

FIG. 1 illustrates an exemplary resource table 102 that comprises resources with varying and out-of-line content. At lease two resources in resource table 102 are purchase order documents, or in other words, XML documents that may conform to a Purchase Order schema, and are stored in purchase order table 104. At least two other resources in resource table 102 are auction documents, or in other words, XML documents that may conform to an Auction schema, and are stored in auction table 106. Further suppose that an index exists on column 122 of purchase order table 104 and on column 124 of auction table 106. Based on the above query, it is difficult to determine whether to restrict the query to just purchase order table 104 or other tables, such as auction table 106. If a user indicated in a query the schema to which the targeted resources conformed, then the query could be (relatively easily) rewritten. However, users typically do not provide such schema information when issuing queries.

Thus, in typical situations when query rewrite must occur, the compiler must make a complex set of inferences from the query and limit the possible tables and associated indexes as much as possible. Although a compiler has access to metadata of tables and statistics about previous queries, the compiler does not have access to rows of tables, and thus is unable to determine to which schema the contents of a resource conforms.

Queries that accessed columns on which no indexes existed or queries that could not be easily rewritten were evaluated functionally (i.e., indexes are not used) and were therefore executed relatively slowly. Even when rewrite did occur, several complex joins were needed if the indexed column was an out-of-line table.

One approach that addresses the problem of querying a repository of resources uses the XML Index framework provided by Oracle™. However, the XML Index framework does not support fragment extraction within some resources, relies on a join with an additional table for some queries, and does not support indexing of virtual content. Thus, there is a need to provide a more efficient mechanism to process queries.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
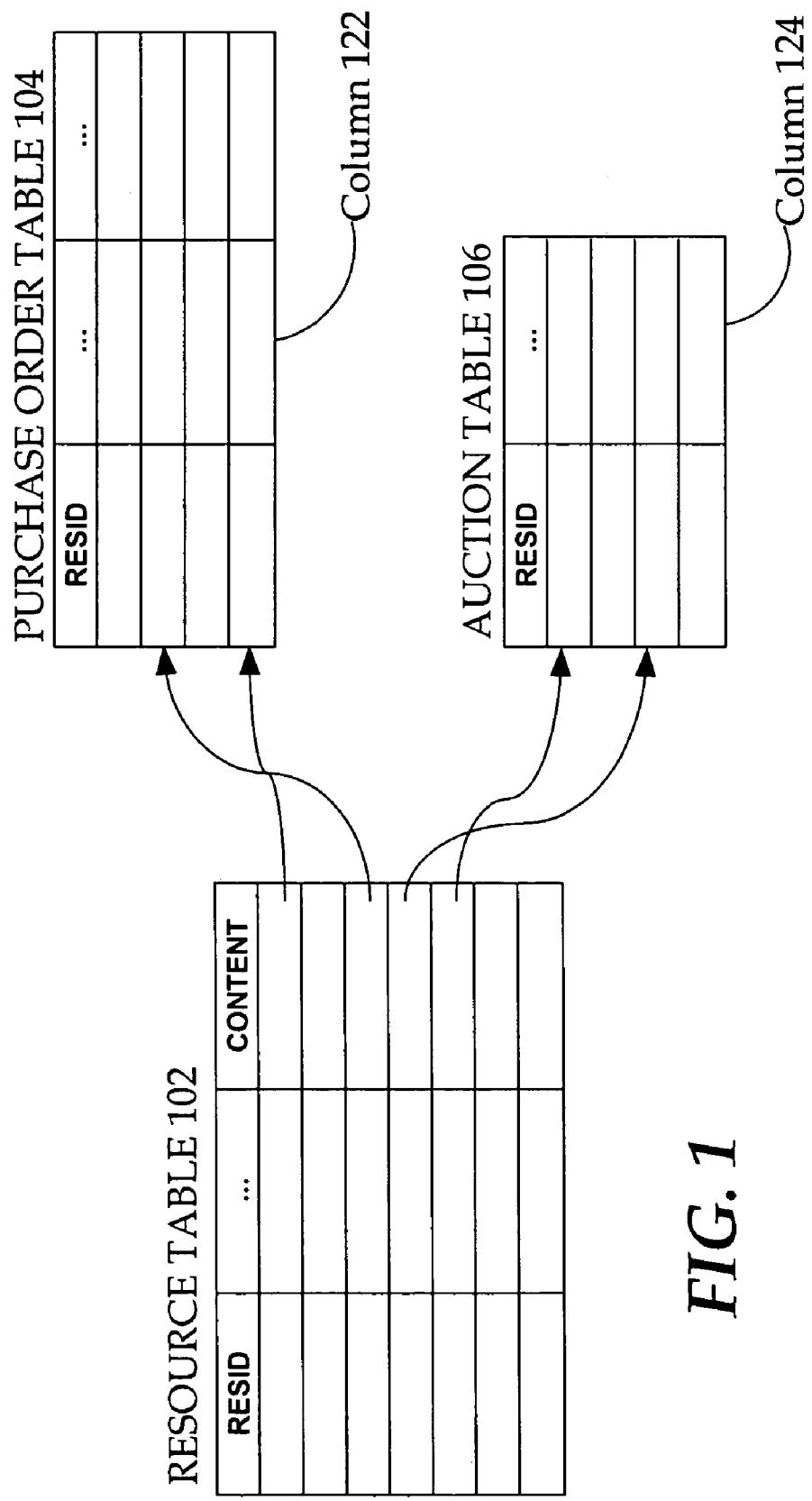
FIG. 1 illustrates an exemplary resource table with out-of-line content.

In the following description, for the purposes of explanation, numerous specific details are set forth in order to provide a thorough understanding of the present invention. It will be apparent, however, that the present invention may be practiced without these specific details. For example, the following description discusses XML documents; however, embodiments of the invention are not limited to XML documents. Any type of resource that can be indexed based on the resource's content and location in a hierarchy may be queried on. In other instances, well-known structures and devices are shown in block diagram form in order to avoid unnecessarily obscuring the present invention.

General Overview

According to an embodiment of the invention, each resource in a hierarchy of resources has a hierarchical location within the resource hierarchy. The content of each resource may include a hierarchy of nodes (e.g., elements in an XML document), each node being associated with a particular hierarchical location within a resource. An index, referred to herein as a repository index, indexes the hierarchical location of a resource within the resource hierarchy and indexes hierarchical location of nodes within the resource that contains the nodes. The repository index enables more efficient computation of queries that request data based on both the hierarchical location of a resource within a resource hierarchy and the hierarchical of location of the nodes within a resource. This sort of index avoids the need to perform complex joins that would otherwise be needed if separate indexes were used for the resource's hierarchical location within the resource hierarchy and a node's hierarchical location within a resource.

According to one embodiment, a repository index supports an extended format for a locator in a storage table of the repository index to allow for storing the locations of nodes in XML that are stored object-relationally. The ability to store the locations of nodes in XML that are stored object-relationally allows the repository index to be used for extracting fragments within any resource, irrespective of the storage format of the data of the resource or user-defined properties of the resource.

According to one embodiment, the repository index stores information about virtual content. Virtual content is content stored outside of the tables managed by a database. Virtual content may even be content stored outside of the local file system on which the database resides. The repository index may also be used to answer queries on resources with virtual content.

Overview of Repository Index

A single repository index is built that may be queried to retrieve all information contained in a repository; not only the data portion of each resource, but also metadata of each resource, such as system properties and user-defined properties. The data and metadata of a resource together is referred to as the "content" of the resource since both data and metadata of a resource may be indexed, queried, and retrieved.

The data portion of a resource may be XML that conforms to an XML schema registered with an XML database, may be XML that does not conform to any XML schema registered with the database, or may not be XML.

Regardless of whether the data portion of a resource conforms to an XML schema, each resource (i.e., a file or folder) in the repository may be modeled as an XML document, and therefore an XML Index framework may be used to answer resource-level queries. For example, even if the data portion of a resource is non-XML, the data portion is embedded in XML tags, making the entire resource a rooted XML document.

Thus, each resource that is modeled as an XML document may conform to a common XML schema called the Resource Schema. Resource Schema defines standard resource properties (e.g. creation time) but allows each resource to have arbitrary content and user-defined properties.

Each resource in the repository is associated with a location path that identifies a resource's location within a resource hierarchy (e.g., a set of folders under which the resource is located). The collection of all location paths defines a folder hierarchy in a manner similar to a typical file system. Each node within the content of a resource is associated with a content path that identifies the node's hierarchical location within the resource.

Users are able to query and retrieve resources (or portions thereof) that match user-specified criteria. User-specified criteria may include any content of a resource (including metadata of the resource), location path of a resource within the resource hierarchy, content path of one or more nodes within a resource, and/or a combination of the above.

Each resource in the repository is represented by a row in an object-relational table called the resource table, whose structure is based on mappings specified in the Resource Schema. If the content of a resource is XML, then the content may be stored in a row of an out-of-line table and the corresponding row in the resource table stores a reference (i.e. a disk pointer) to the row of the out-of-line table. The rows of the out-of-line table may be stored in any of the many storage formats supported by the database, such as text within a CLOB, as rows in object-relational tables, as encoded binary XML in a BLOB, or as a hybrid of one of the above formats.

Some resources in the repository may be transient in memory; that is, they are stored on disk in one form and accessed in memory in another form. For example, an owner property of a resource may be transient in that the owner property is presented to a user as a text string, but is stored on disk as an owner-id property, consisting of a (seemingly random) set of characters. Thus, when the property is read from disk into memory, an implicit conversion is performed.

The repository index may be modeled as an XML index. Each resource in the repository and each node in a resource may have a corresponding entry in a storage table of the repository index (later referred to as a PATH table, described below). If an entry corresponds to a resource, then the entry stores hierarchical information of the resource within the repository and, optionally, a resource identifier that uniquely identifies the resource. If an entry corresponds to a node in a resource, then the entry stores a resource identifier and, optionally, a locator to the node in the resource.

Resource Hierarchy

According to an embodiment, resource hierarchy information is stored in an XML index to represent the resource hierarchy of a collection of resources in a repository. The resource hierarchy information is used to determine which resources fall within a given location path. The hierarchy information is illustrated within the context of exemplary resource hierarchy 201, shown in FIG. 2A.

Exemplary resource hierarchy 201 includes directories arranged in a hierarchy. Three documents 203, 205, and 207 are stored in the directories. Specifically, documents 203, 205, and 207, which are respectively entitled "po1.xml", "po2.xml", and "po1.xml", are stored in one of directories 204 and 208, which are respectively entitled "a" and "c".

In the directory hierarchy, directories 204, 206, and 208 are children of directory 202. Directory 202 is referred to as the "root" directory because it is the directory from which all other directories descend. In many systems, the symbol "/" is used to refer to the root directory.

When electronic information is organized in a hierarchy, each item of information may be located by following a "path" through the hierarchy to the entity (e.g., directory) that contains the item. Within a resource hierarchy, the location path to an item begins at the root directory and proceeds down the hierarchy of directories to eventually arrive at the directory that contains the item of interest. For example, the path to document 205 consists of directories 202 and 204, in that order.

A convenient way to identify and locate a specific item of information stored in a hierarchical storage system is through the use of the location path of the item or through the use of a "pathname". A pathname is data that represents a path, such as a location path. A pathname is a concise way of uniquely identifying a resource (e.g., either a directory or a document) based on the path through the hierarchy to the resource. A pathname may be composed of a sequence of names (similar to a location path), referred to as path elements or may be composed of an encoded form of a location path. In the context of a resource hierarchy, each name in the sequence of names is a "resource name". The term "resource name" refers to both the names of directories and the names of documents, since both directories and documents are considered to be "resources".

Within a resource hierarchy, the sequence of resource names in a given pathname may begin with the name of the root directory, may include one or more names of all directories along the path from the root directory to the item of interest, and may terminate in the name of the item of interest. Typically, the list of directories to traverse is concatenated together, with some kind of separator punctuation (e.g., '/', '\', or ';') to make a pathname. Thus, the pathname for document 203 may be /a/po1.xml, while the pathname for document 207 may be /c/po1.xml.

Examples and embodiments of the invention described hereafter refer to a location path. However, embodiments of the invention may also, or alternatively, use a pathname of a resource.

Resource Table

Figures 2A, 2B:
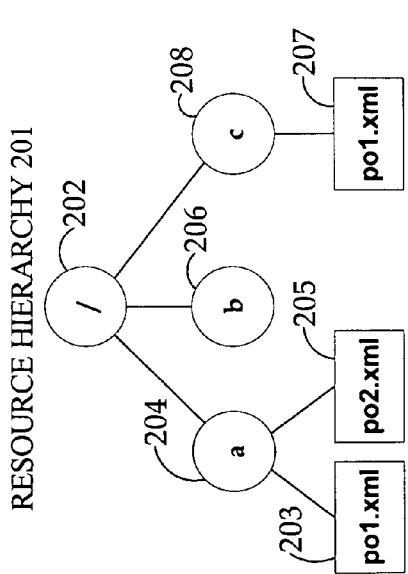
FIG. 2A illustrates a tree-like structure of an exemplary resource hierarchy.
FIG. 2B illustrates a resource table that stores resources in the exemplary resource hierarchy, according to an embodiment of the invention.

FIG. 2B is a diagram that illustrates a resource table 210 that contains an entry for each resource in the repository. Each entry may include a ResID 212, a Name 214, a modification date 216, an author 218, and a content column 220. However, a resource table may comprise more or less columns. For example, resource table 210 may comprise system-maintained information such as creation date, access permission information, etc.

The ResID is a unique row identifier assigned to each row of resource table 210 by the database system. Because a row in resource table 210 corresponds to one resource within resource hierarchy 201, the row ID in ResID can serve as a resource identifier for the resource and, if the resource is a document, as a document identifier for the document. The content field may store the actual contents of a resource in the form of a binary large object (BLOB), or a pointer to the contents of the resource or document. Where the entry is for a resource having no content (e.g. a directory), the body field may be null. In the above example, only the three XML documents have content; thus, the body field for each of the other entries is null.

Repository Index

For the purpose of explanation of a repository index, examples shall be given hereafter with reference to the following two XML documents:

```
po1.xml
<PurchaseOrder>
    <Reference>SBELL-2002100912333601PDT</Reference>
    <Actions>
        <Action>
            <User>SVOLLMAN</User>
        </Action>
    </Actions>
    ....
</PurchaseOrder>
po2.xml
<PurchaseOrder>
    <Reference>ABEL-20021127121040897PST</Reference>
    <Actions>
        <Action>
            <User>ZLOTKEY</User>
        </Action>
        <Action>
            <User>KING</User>
        </Action>
    </Actions>
    ....
</PurchaseOrder>
```

As indicated above, po1.xml and po2.xml are merely two examples of XML documents. The techniques described herein are not limited to XML documents having any particular types, structure or content. Examples shall be given hereafter of how documents with hierarchically-organized content would be indexed and accessed according to various embodiments of the invention.

According to one embodiment, a repository index is an index that improves the performance of queries that include Xpath-based predicates and/or Xpath-based fragment extraction. A repository index can be built, for example, over both XML Schema-based as well as schema-less XMLType columns which are stored either as CLOB, structured storage, or object relationally. In one embodiment, a repository index is a logical index that results from the cooperative use of a PATH table (described in more detail below) and multiple secondary indexes, which may include a path index, a value index, and an order index (also described below).

According to one embodiment, a repository index indexes not only content of a resource, but also metadata about the resource and/or its content. There are two types of metadata: user-defined/custom metadata and system metadata. Custom metadata typically describes information about the content itself and is applicable to all or most resources of the same type. System metadata of a resource are properties about the resource, but are applicable to all the resources in the repository, irregardless of the type. Examples of system metadata may include author, creation date, and modification date, which may also be included in the resource (or base) table, as illustrated above in FIG. 2B.

Any resource in the repository may be modeled as an XML document. Thus, any resource may conform to an XML schema. To allow for the high variability in the type of custom metadata that may be associated with a resource, XML Schema allows for arbitrary user content, which may or not be XML. XML Schema supports arbitrary user content with the tag <any>.

The path index provides the mechanism to lookup fragments based on path expressions. The value index indexes the PATH table by values associated with the rows in the PATH table and thus provides the lookup based on value equality or range. There could be multiple secondary value indexes. The order index associates hierarchical ordering information with indexed nodes. The order index is used to determine parent-child, ancestor-descendant and sibling relationships between XML nodes.

The Path Table

According to one embodiment, a repository index includes a PATH table, and a set of secondary indexes. As mentioned above, each indexed document may include many indexed nodes. The PATH table contains one row per indexed node. For each indexed node, the PATH table row for the node contains various pieces of information associated with the node. The PATH table may also contain a row for each resource as a whole where the row includes hierarchical information that identifies the hierarchical location of the resource within the repository. Thus, for a particular resource, the PATH table may contain a row for the resource and a row for each indexed node of the resource.

In one embodiment, the documents that are indexed by the repository index are XML documents. In a related embodiment, one or more XML documents in the resource hierarchy conform to one XML schema and one or more other XML documents in the resource hierarchy conform to another XML schema and or no XML schema.

According to one embodiment, the information contained in the PATH table for a node in a resource includes (1) a content path that indicates the path to the node, (2) "location data" for locating the data for the node within the base structure, and (3) "hierarchy data" that indicates the position of the node within the hierarchy of the resource that contains the node. Optionally, the PATH table may also contain value information for those nodes that are associated with values.

Paths

The structure of an XML document establishes parent-child relationships between the nodes within the XML document. The "path" for a node in an XML document reflects the series of parent-child links, starting from a "root" node, to arrive at the particular node. For example, the path to the "User" node in po2.xml is /PurchaseOrder/Actions/Action/User, since the "User" node is a child of the "Action" node, the "Action" node is a child of the "Actions" node, and the "Actions" node is a child of the "PurchaseOrder" node.

The set of XML documents that a repository index indexes is referred to herein as the "indexed XML documents". According to one embodiment, a repository index may be built on all of the paths within all of the indexed XML documents, or a subset of the paths within the indexed XML documents. Techniques for specifying which paths are indexed are described hereafter. The set of paths that are indexed by a particular repository index are referred to herein as the "indexed XML paths".

Location Path of a Resource

As stated above, an entry in the repository index may include the location path of the corresponding resource. The repository index may include a column dedicated only to store the location path of a resource. However, for the entries of the indexed nodes of a resource, the column may be empty or, if populated, provide information that is duplicated elsewhere in the repository index. To avoid such wastefulness, the repository index may have a column that holds either a location path or a content path.

In one embodiment, a bit in the locator value (described below in the section "Location Data") of an entry indicates whether the path in the Path column is a location path or a content path.

In one embodiment, the location path of a particular resource includes references to any resources that have a child relationship with the particular resource. For example, the location path of an entry for a given directory may store, in an array, an "array entry" for each child resource of the given directory. According to one embodiment of the invention, the repository index does not have entries for resources that do have children (e.g., documents, empty directories). To facilitate an efficient traversal of the repository index, each array entry may contain a reference to the row, in the repository index, that corresponds to the child resource that corresponds to the array entry.

U.S. patent application Ser. No. 10/260,381 referenced above describes how a hierarchy index may be used to access a document based on the location path of the document. Although the hierarchy index described in the patent application is separate from the repository index described herein, the principle of traversing the hierarchy index to access a resource based on the resource's location path may also apply to traversing the disclosed repository index.

Location Data

The location data associated with a node indicates where the node is stored within the base structures. Thus, the nature of the location data will vary from implementation to implementation based on the nature of the base structures. Depending on how the actual XML document is stored, the location data may also include a locator or logical pointer to point into the XML document. The logical pointer may be used for extracting fragments that are associated with nodes identified by XPaths.

For the purpose of explanation, it shall be assumed that (1) the base structures are tables within a relational database, and (2) each indexed XML document is stored in a corresponding row of a base table (e.g., resource table 210). In such a context, the location data for a node may include, for example, (1) the rowid of the row, within the base table, in which the XML document containing the node is stored, and (2) a locator that provides fast access within the XML document, to the fragmented data, that corresponds to the node.

Locator

In some cases, XML documents are stored in object-relational tables as opposed to being stored as encoded binary XML in a BLOB or as text within a CLOB. When an XML document is stored in an object-relational table, the tags of the nodes of the XML document are separated from the values of the nodes. The values of the nodes are stored in rows of the tables, whereas the corresponding tags become the name of the columns and/or part of the metadata of the tables. A node fragment may comprise not only opening and closing tags of the node, but also attributes of the node and any descendents of the node. When performing fragment extraction, the locators may not contain enough information for piecing together all the tags of a particular fragment. Therefore, any tag and attribute information of a particular node, if stored object-relationally, could not returned.

According to one embodiment, a locator is formatted to support the access of fragments of XML documents stored in object-relational tables. The new locator may be generic enough to identify an object-relational table, a row, and a column within the table. If nodes of an XML document are stored within a variable array (or "v-array") in an object-relational table, then the locator may also indicate the exact entry in the v-array where the node begins.

In one embodiment, a locator includes the following fields: flag, column identifier, an optional table identifier, an optional index in a "v-array" column, an optional start offset in a CLOB column, and an optional end offset in a CLOB column. The flag field is similar to the flag field in the locator stored in the PATH table for an XML document that is stored as CLOB or binary XML. However, the flag field may have an additional bit to indicate whether a table identifier is stored in the locator.

Path Table Example

According to one embodiment, the PATH table includes columns defined as specified in the following table:

| Column Name | Datatype | Description |
|---|---|---|
| PATH | RAW(8) | Content path of a node in a resource or location path of a directory. |
| RESID | URESID/ RESID | ResID of the resource (e.g., that corresponds to a node) in the resource table (e.g., resource table 210) that maintains documents and other resources of the resource hierarchy. |
| LOCATOR | RAW(100) | This is used during fragment extraction regardless of how the data is stored. |
| VALUE | RAW(2000)/ BLOB | Value of the node in case of attributes and simple elements. The type can be specified by the user (as well as the size of the RAW column) |

As explained above, if an entry in the PATH table corresponds to a node, then the PATH is the content path of the node. PATH may instead be (or include) an identifier that uniquely represents the content path of a node. Also, as explained above, if an entry in the PATH table corresponds to a resource, then the PATH is the location path of the resource in the resource hierarchy.

The VALUE column stores the effective text value for simple element nodes (i.e., no element children) and attribute nodes. According to one embodiment, adjacent text nodes are coalesced by concatenation. As shall be described in greater detail hereafter, a mechanism is provided to allow a user to customize the effective text value that gets stored in VALUE column by specifying options during index creation e.g. behavior of mixed text, whitespace, case-sensitive, etc can be customized. The user can store the VALUE column in any number of formats, including a bounded RAW column or a BLOB. If the user chooses bounded storage, then any overflow during index creation is flagged as an error.

The PATH table may include other columns (not shown), such as a column for the order key of a node and a column for a locator of a node. The order key of a node is a Dewey ordering number of the node. The internal representation of the order key may preserve document ordering. A locator of a node indicates at least the starting position for the fragment corresponding to the node. The locator is used during fragment extraction.

The following table is an example of a PATH table that (1) has the columns described above, and (2) is populated with entries for po1.xml and po2.xml. Specifically, each row of the PATH table corresponds to an indexed node of either po1.xml or po2.xml. In this example, po1.xml and po2.xml are respectively stored at rows R3 and R4 of a base (i.e., resource) table (see FIG. 2B).

POPULATED PATH TABLE

| rowid | Path | Resid | Locator | Value |
|---|---|---|---|---|
| 1 | /a/po1.xml | r3 | | |
| 2 | /a/po2.xml | r4 | | |
| 3 | /PurchaseOrder | r3 | | |
| 4 | /PurchaseOrder/ Reference | r3 | | SBELL-2002100912333601PDT |
| 5 | /PurchaseOrder/ Actions | r3 | | |
| 6 | /PurchaseOrder/ Actions/Action | r3 | | |
| 7 | /PurchaseOrder/ Actions/Action/User | r3 | | SVOLLMAN |
| 8 | /PurchaseOrder | r4 | | |
| 9 | /PurchaseOrder/ Reference | r4 | | ABEL-20021127121040897PST |
| 10 | /PurchaseOrder/ Actions | r4 | | |
| 11 | /PurchaseOrder/ Actions/Action | r4 | | |
| 12 | /PurchaseOrder/ Actions/Action/User | r4 | | ZLOTKEY |
| 13 | /PurchaseOrder/ Actions/Action | r4 | | |
| 14 | /PurchaseOrder/ Actions/Action/User | r4 | | KING |

In this example, the rowid column stores a unique identifier for each row of the PATH table. Depending on the database system in which the PATH table is created, the rowid column may be an implicit column. For example, the disk location of a row may be used as the unique identifier for the row. Secondary Order and Value indexes may use the rowid values of the PATH table to locate rows within the PATH table.

In the embodiment illustrated above, the PATH and VALUE of a node are all contained in a single table. In an alternative embodiment, separate tables may be used to map the PATH and VALUE information to corresponding location data (e.g. the base table Resid and Locator).

Secondary Indexes

The PATH table may include the information required to locate the XML documents, or XML fragments, that satisfy a wide range of queries. However, without secondary access structures, using the PATH table to satisfy such queries will often require full scans of the PATH table. Therefore, according to one embodiment, a variety of secondary indexes are created by the database server to accelerate the queries that (1) perform path lookups and/or (2) identify order-based relationships. According to one embodiment, the following secondary indexes are created on the PATH table.

PATHID_INDEX on (path, rid)
ORDERKEY_INDEX on (rid, order_key)
VALUE INDEXES
PARENT_ORDERKEY_INDEX on (rid, SYS_DEWEY_PARENT(order_key))

Using the Repository Index in Executing a Query

According to an embodiment of the invention, a single repository index may be used to efficiently execute queries. For example, the query may be:

```
select PurchaseOrder/Reference from resource_table
where under_path('/a') > 0
and existNode(/PurchaseOrder/Actions/Action/User, Svollman);
```

Execution of this query, using a database server that manages a database, selects all purchase order reference nodes that are associated with XML documents that satisfy both conditions specified in the WHERE clause. One condition is that the XML document must be found under the '/a' path. The other condition is that a node within the XML document must have a '/PurchaseOrder/Actions/Action/User' node with 'Svollman' as its value.

Because location path and content path information are stored using the same index, when the database server receives this query, no complex set of inferences need to be made to determine which index needs to be accessed. A single repository index may be used to satisfy the specified conditions. The database server may then rewrite the query to reference the repository index.

As described above, the query may specify a pathname of the location path instead of the actual location path. Also, instead of the actual content path, the query may specify a pathname that represents the content path.

The repository index is used to determine the resource identifiers corresponding to XML documents that are found under the path '/a'. As described above, the repository index may associate documents that are indexed with row identifiers. A row identifier of a document may serve as a resource or document identifier that corresponds to the documents. According to the PATH table described above, resource identifiers r3 and r4 are associated with documents under the path '/a' and are returned as a result of using the repository index.

The repository index is also used to determine the resource identifiers corresponding to all XML documents that have a '/PurchaseOrder/Actions/Action/User' content path, where the 'User' node has a value of "Svollman". Both the seventh and twelfth row of the populated PATH table above have a column with the same path as the specified content path. Because, the seventh row of the populated path table has the same value as the specified value, the corresponding resource identifier 'r3' is returned. Because the resource identifier 'r3' is the only common resource identifier in both sets of results, the row in resource table 210 with 'r3' as the resource identifier may be accessed to determine the value of the 'PurchaseOrder/Reference' node as specified in the query. Whether the actual content of the document corresponding to 'r3' is stored in resource table 210 or is stored separately therefrom (i.e. out-of-line content), the document (i.e., po1.xml in this example) may be manifested and traversed to retrieve the value of the 'PurchaseOrder/Reference' node.

Thus, queries that include both a location path and a content path are executed more efficiently by avoiding computation-expensive operations to manifest, unnecessarily, entire XML documents and/or avoiding iteratively checking whether XML documents satisfy a specified location path. Furthermore, such queries also avoid unnecessary joins with results from other indexes.

The following is another example of a query that specifies metadata, or properties, of one or more resources:

```
select res from resource_table
where under_path('/home/users/john') > 0
and existResource(last-modification-date, 7/12/2006–8/12/2006);
```

Execution of this query, using a database server that manages a database, selects all resources that satisfy both conditions specified in the WHERE clause. One condition is that the resource must be found under the '/home/users/john' path. The other condition is that the date in which the resource was last modified must have occurred between Jul. 12, 2006 and Sep. 12, 2006.

A secondary index (not mentioned above) may exist on the last-modification-date property. Alternatively, the resource table (e.g., resource table 210) may have a column for the last-modification-date property. In either case, a first set of resource identifiers are identified from using the secondary index or scanning the resource table. A second set of resource identifiers are identified from using the PATH table. The resource identifiers that are common in both the first set and a second set are returned to the user.

Virtual Content

Resources in a database may have virtual content. Virtual content is content stored outside of the resource repository (e.g., tables managed by the database). Virtual content may even be stored outside of the local file system on which the database resides. According to one embodiment, when one or more resources and a repository are indexed, if the content of any of the one or more resources is virtual content, then the virtual content is accessed and indexed. An example of a reference to virtual content may be a uniform resource locator (URL) that is used to access the content on the World Wide Web.

Hardware Overview

Figure 3:
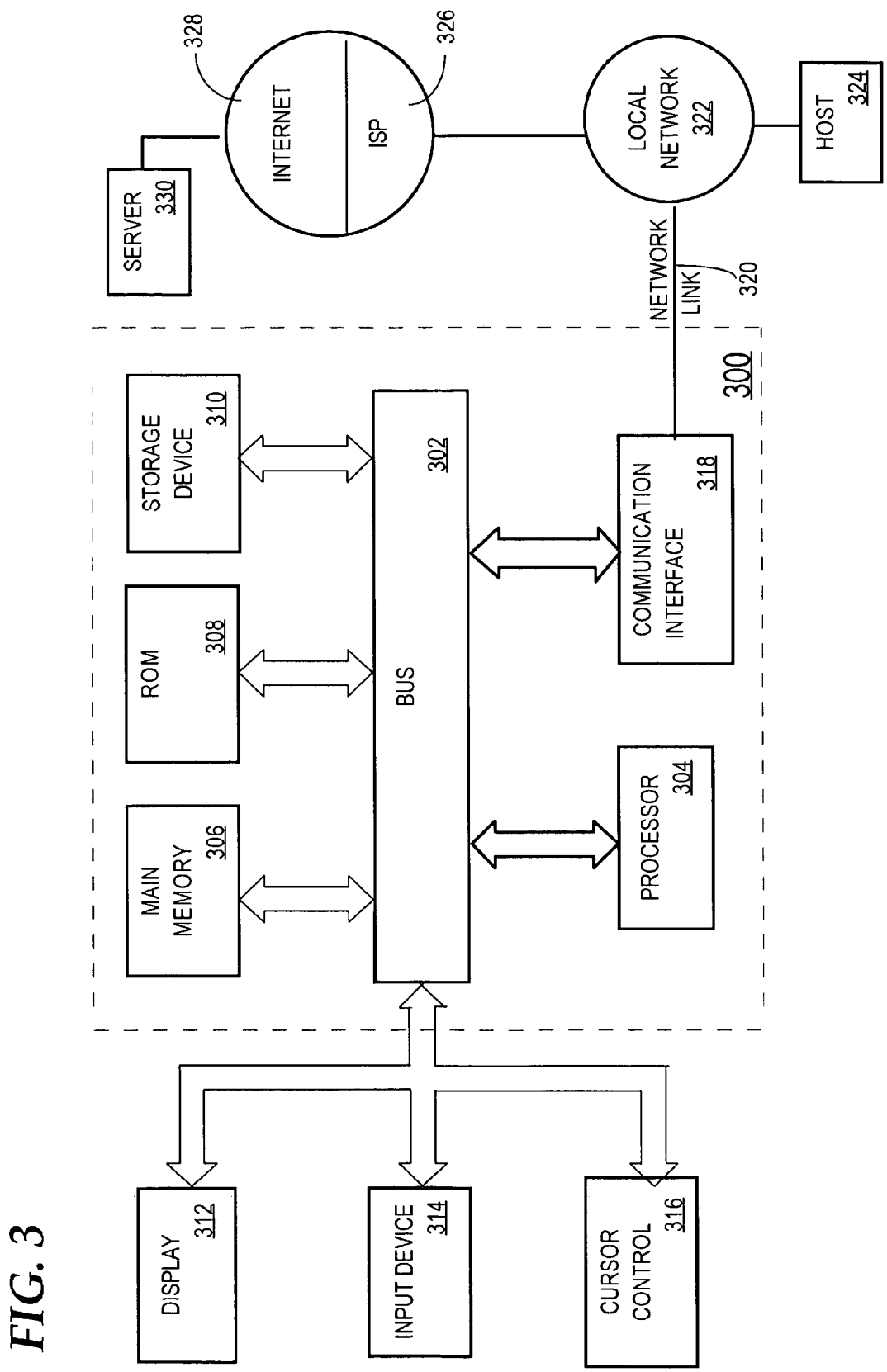
FIG. 3 shows a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising the steps of:

receiving a query that requests data from a resource repository that stores multiple resources in a resource hierarchy;

wherein content of each of the multiple resources conforms to a hierarchical markup language;

wherein the query includes:

a resource location path that (a) identifies a hierarchical location of a first set of one or more resources within the resource hierarchy of the resource repository (b) without identifying any particular content of a resource in the resource repository, and a content path that identifies a hierarchical location of one or more nodes within content of a second set of one or more resources;

storing an index that includes:
  entries that index resource location paths for a plurality of resources within the resource hierarchy, and
  entries that index content paths for the plurality of resources;
computing the query, wherein computing includes:
  using, based on the resource location path, said index to generate first results that identify the first set of one or more resources, and
  using, based on the content path, said index to generate second results that identify the one or more nodes and that identify the second set of one or more resources; and
computing results of the query based on the first results and the second results, wherein the results of the query identify a particular set of one or more resources that are a subset of (1) the first set of one or more resources and (2) the second set of one or more resources;
wherein the steps are performed on one or more computing devices.

2. The method of claim 1, wherein the content of a resource of the multiple resources includes at least one of the following: system properties of the resource, user-defined properties of the resource, and the data of the resource.

3. The method of claim 2, wherein:
the content includes system properties of the resource; and
the system properties of each resource in the resource repository conform to a particular XML schema.

4. The method of claim 2, wherein:
the content includes user-defined properties of the resource; and
a subset of the user-defined properties do not conform to a particular XML schema.

5. The method of claim 2, wherein:
the content includes the data of the resource; and
a subset of the data does not conform to a particular XML schema.

6. The method of claim 1, wherein:
the index comprises a path identifier column and a locator column; and
a bit in the locator column of an index entry indicates whether the corresponding path identifier indicates a resource location path of the resource that corresponds to said index entry or an XPath string of a node, in the resource, that corresponds to said index entry.

7. The method of claim 1, wherein:
said content path includes an XPath string that identifies said one or more nodes within said second set of one or more resources in said resource repository; and
said index is used to lookup said resource location path and said XPath string.

8. The method of claim 1, wherein a subset of said plurality of resources is stored outside of said resource repository when said index is generated.

9. The method of claim 1, wherein:
each resource of the multiple resources is associated with one or more properties; and
at least one of said one or more properties is stored on disk as one datatype and resides in memory as a different datatype.

10. The method of claim 1, wherein:
a first subset of said plurality of resources are stored in an object-relational (O-R) format,
a second subset of said plurality of resources are stored in a large object (LOB) format, and
the index includes a locator column that is used as both a locator of resources stored in the O-R format and a locator of resources stored in the LOB format.

11. The method of claim 10, wherein the LOB format includes at least one of the following formats: text within a character large object (CLOB) and encoded binary XML in a binary large object (BLOB).

12. The method of claim 10, wherein:
the query specifies an XPath string that indicates a fragment is to be extracted;
the fragment is a portion of a particular resource of said plurality of resources;
the particular resource is an XML document conforming to an XML schema;
the index is used to determine a locator value, corresponding to the locator column, of one or more nodes specified by the XPath string; and
the locator value is used to extract the fragment from where the particular resource is stored.

13. The method of claim 1, wherein the resource location path includes at least one directory name.

14. One or more storage media storing instructions which, when executed by one or more processors, cause:
receiving a query that requests data from a resource repository that stores multiple resources in a resource hierarchy;
wherein content of each of the multiple resources conforms to a hierarchical markup language;
wherein the query includes:
  a resource location path that identifies (a) a hierarchical location of a first set of one or more resources within the resource hierarchy of the resource repository (b) without identifying any particular content of a resource in the resource repository, and
  a content path that identifies a hierarchical location of one or more nodes within content of a second set of one or more resources;
storing an index that includes:
  entries that index resource location paths for a plurality of resources within the resource hierarchy, and
  entries that index content paths for the plurality of resources;
computing the query, wherein computing includes:
  using, based on the resource location path, said index to generate first results that identify the first set of one or more resources, and
  using, based on the content path, said index to generate second results that identify the one or more nodes and that identify the second set of one or more resources; and
computing results of the query based on the first results and the second results, wherein the results of the query identify a particular set of one or more resources that are a subset of (1) the first set of one or more resources and (2) the second set of one or more resources.

15. The one or more storage media of claim 14, wherein the content of a resource of the multiple resources includes at least one of the following: system properties of the resource, user-defined properties of the resource, and the data of the resource.

16. The one or more storage media of claim 15, wherein:
the content includes system properties of the resource; and
the system properties of each resource in the resource repository conform to a particular XML schema.

17. The one or more storage media of claim 15, wherein:
the content includes user-defined properties of the resource; and a subset of the user-defined properties do not conform to a particular XML schema.

18. The one or more storage media of claim 15, wherein: the content includes the data of the resource; and
a subset of the data does not conform to a particular XML schema.

19. The one or more storage media of claim 14, wherein: the index comprises a path identifier column and a locator column; and
a bit in the locator column of an index entry indicates whether the corresponding path identifier indicates a resource location path of the resource that corresponds to said index entry or an XPath string of a node, in the resource, that corresponds to said index entry.

20. The one or more storage media of claim 14, wherein: said content path includes an XPath string that identifies said one or more nodes within said second set of one o more resources in said resource repository; and
said index is used to lookup said resource location path and said XPath string.

21. The one or more storage media of claim 14, wherein a subset of said plurality of resources is stored outside of said resource repository when said index is generated.

22. The one or more storage media of claim 14, wherein: each resource of the multiple resources is associated with one or more properties; and
at least one of said one or more properties is stored on disk as one datatype and resides in memory as a different datatype.

23. The one or more storage media of claim 14, wherein:
a first subset of said plurality of resources are stored in an object-relational (O-R) format,
a second subset of said plurality of resources are stored in a large object (LOB) format, and
the index includes a locator column that is used as both a locator of resources stored in the O-R format and a locator of resources stored in the LOB format.

24. The one or more storage media of claim 23, wherein the LOB format includes at least one of the following formats: text within a character large object (CLOB) and encoded binary XML in a binary large object (BLOB).

25. The one or more storage media of claim 23, wherein:
the query specifies an XPath string that indicates a fragment is to be extracted;
the fragment is a portion of a particular resource of said plurality of resources;
the particular resource is an XML document conforming to an XML schema;
the index is used to determine a locator value, corresponding to the locator column, of one or more nodes specified by the XPath string; and
the locator value is used to extract the fragment from where the particular resource is stored.

26. The one or more storage media of claim 14, wherein the resource location path includes at least one directory name.

* * * * *

UNITED STATES PATENT AND TRADEMARK OFFICE
CERTIFICATE OF CORRECTION

PATENT NO. : 7,840,590 B2
APPLICATION NO. : 11/641379
DATED : November 23, 2010
INVENTOR(S) : Man-Hay Tam et al.

It is certified that error appears in the above-identified patent and that said Letters Patent is hereby corrected as shown below:

On page 2, in column 2, under "Other Publications", line 18, delete "05732473.3.-1225," and insert -- 05732473.3-1225, --, therefor.

On page 2, in column 2, under "Other Publications", line 24, delete "05732473.3.-1225," and insert -- 05732473.3-1225, --, therefor.

In column 2, line 11, delete "lease" and insert -- least --, therefor.

In column 17, line 17, in claim 20, delete "o" and insert -- or --, therefor.

Signed and Sealed this
Second Day of August, 2011

David J. Kappos
*Director of the United States Patent and Trademark Office*